(12) United States Patent
Shim et al.

(10) Patent No.: US 11,378,844 B2
(45) Date of Patent: Jul. 5, 2022

(54) VIEWER-SIDE POLARIZING PLATE FOR LIQUID CRYSTAL DISPLAY DEVICE, AND LIQUID CRYSTAL DISPLAY DEVICE COMPRISING SAME

(71) Applicant: Samsung SDI Co., Ltd., Yongin-si (KR)

(72) Inventors: Dae Seob Shim, Suwon-si (KR); Hyoung Tae Lim, Suwon-si (KR); Seong Heun Cho, Suwon-si (KR); Se Hyun Park, Suwon-si (KR); Bu Keun Oh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 491 days.

(21) Appl. No.: 16/343,381

(22) PCT Filed: Sep. 18, 2017

(86) PCT No.: PCT/KR2017/010176
§ 371 (c)(1),
(2) Date: Apr. 18, 2019

(87) PCT Pub. No.: WO2018/080017
PCT Pub. Date: May 3, 2018

(65) Prior Publication Data
US 2019/0317353 A1 Oct. 17, 2019

(30) Foreign Application Priority Data
Oct. 31, 2016 (KR) ........................ 10-2016-0143811

(51) Int. Cl.
G02F 1/13363 (2006.01)
G02B 1/14 (2015.01)
(Continued)

(52) U.S. Cl.
CPC .......... *G02F 1/13363* (2013.01); *G02B 1/14* (2015.01); *G02B 5/3083* (2013.01);
(Continued)

(58) Field of Classification Search
CPC ... G02B 1/04; G02B 1/14; G02B 1/16; G02B 5/3033; G02B 5/3083; G02F 1/133528;
(Continued)

(56) References Cited

U.S. PATENT DOCUMENTS

2009/0009863 A1* 1/2009 Nakamura .............. G02B 1/111
359/485.01
2012/0113356 A1* 5/2012 Yu ..................... G02F 1/133528
349/62
2016/0245970 A1* 8/2016 Um ....................... G02B 5/305

FOREIGN PATENT DOCUMENTS

CN 109891281 B * 12/2020 .............. G02B 1/04
JP 2008-233667 A 10/2008
(Continued)

*Primary Examiner* — Sophie Hon
(74) *Attorney, Agent, or Firm* — Lewis Roca Rothgerber Christie LLP

(57) ABSTRACT

Provided are a viewer-side polarizing plate for a liquid crystal display device, and a liquid crystal display device comprising the same, the polarizing plate comprising a polarizer and a protective film formed on a light exit surface of the polarizer, wherein the protective film includes a first primer layer, a protective film substrate, a second primer layer, and a coating layer, which are sequentially laminated on the polarizer, a first protective film satisfies a relation of Equation 1, and the protective film substrate has an in-plane phase difference of 500 nm or less at a wavelength of 550 nm in Equation 2.

17 Claims, 2 Drawing Sheets

(51) Int. Cl.
*G02B 5/30* (2006.01)
*G02F 1/1335* (2006.01)
*G02B 1/16* (2015.01)

(52) U.S. Cl.
CPC .. *G02F 1/133528* (2013.01); *C09K 2323/035* (2020.08); *G02B 1/16* (2015.01); *G02F 1/133562* (2021.01)

(58) Field of Classification Search
CPC ........... G02F 1/133562; G02F 1/13363; G02F 2201/50; C09K 2323/03; C09K 2323/031
See application file for complete search history.

(56) References Cited

FOREIGN PATENT DOCUMENTS

| | | | |
|---|---|---|---|
| KR | 10-2011-0014515 A | | 2/2011 |
| KR | 10-2013-0005514 A | | 1/2013 |
| KR | 10-1273748 B1 | | 6/2013 |
| KR | 10-2016-0038831 A | | 4/2016 |
| KR | 20160038831 A | * | 4/2016 |
| KR | 10-2016-0063539 A | | 6/2016 |
| KR | 101963005 B1 | * | 3/2019 ............... G02B 1/04 |

* cited by examiner

[FIG. 1]
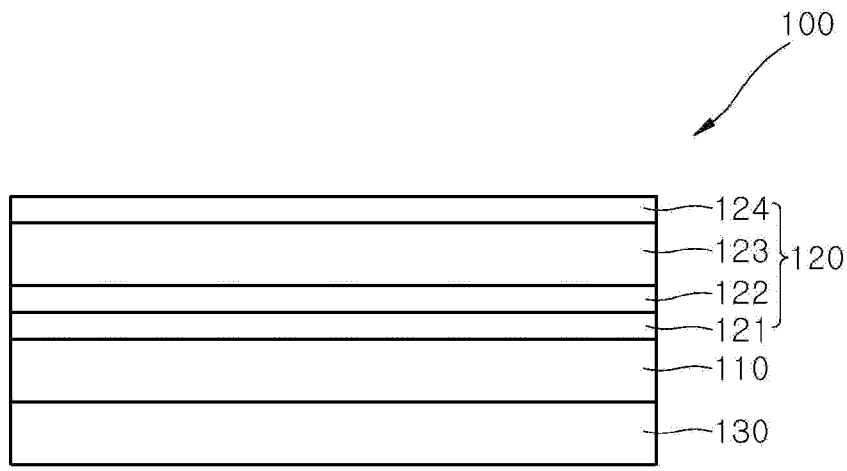
[FIG. 2]
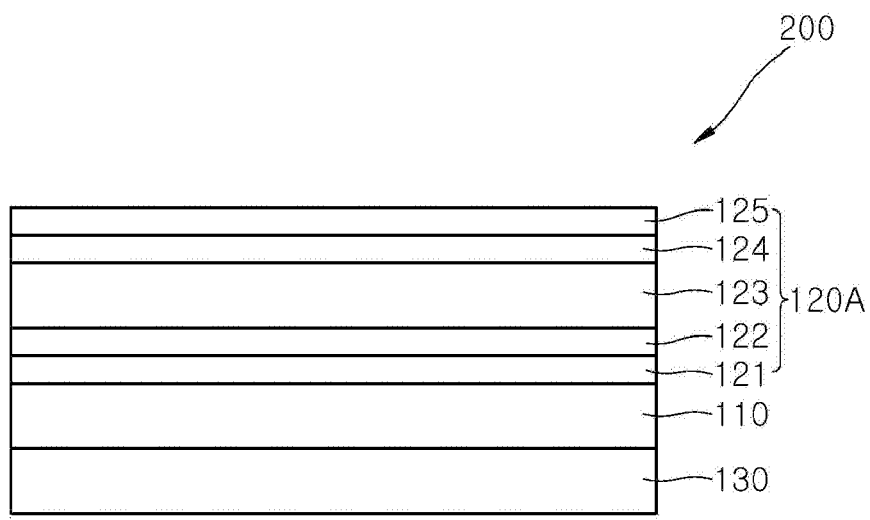

[FIG. 3]
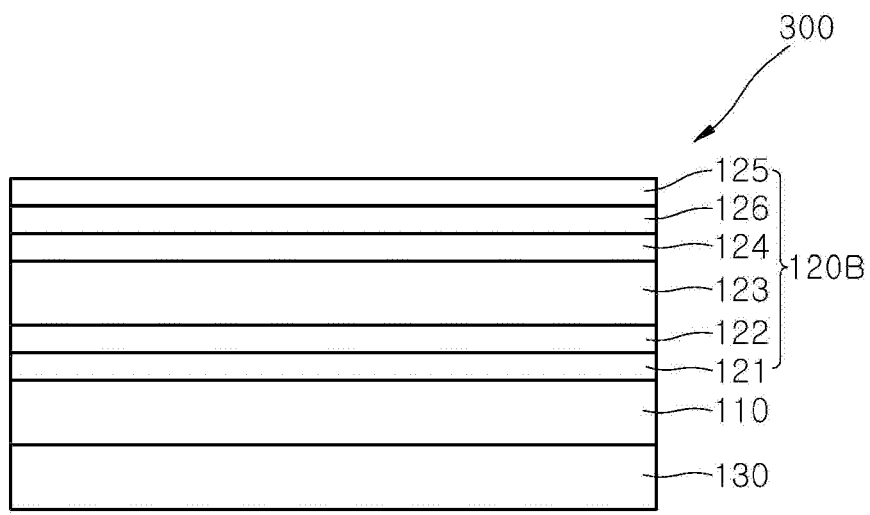

VIEWER-SIDE POLARIZING PLATE FOR LIQUID CRYSTAL DISPLAY DEVICE, AND LIQUID CRYSTAL DISPLAY DEVICE COMPRISING SAME

CROSS-REFERENCE TO RELATED APPLICATIONS

This application is a National Phase Patent Application and claims priority to and the benefit of International Application Number PCT/KR2017/010176, filed on Sep. 18, 2017, which claims priority to and the benefit of Korean Patent Application No. 10-2016-0143811, filed on Oct. 31, 2016, the entire contents of each of which are incorporated herein by reference.

FIELD

The present invention relates to a light source-side polarizing plate for liquid crystal display devices and a liquid crystal display device including the same.

BACKGROUND

Polarizing plates are disposed on upper and lower surfaces of a liquid crystal panel to control oscillation directions of light in order to visualize a display pattern of a liquid crystal display. The polarizing plate includes a polarizer and a protective film formed on at least one surface of the polarizer. The protective film is generally formed of a triacetylcellulose (TAC) film. The TAC film is more expensive than a typical polymer film. An inexpensive polyester film including a polyethylene terephthalate (PET) film and the like is used to replace the TAC film.

A liquid crystal display device is in an operating state or in a non-operating state. With a polarizing plate including a birefringent film, the liquid crystal display device allows rainbow mura to be viewed in the operating state. In the non-operating state, the liquid crystal display device allows rainbow mura to be viewed due to external light, thereby reducing black visibility and causing deterioration in display quality.

The background technique of the present invention is disclosed in Korean Patent Laid-open Publication No. 2011-0014515.

SUMMARY

It is an aspect of the present invention to provide a polarizing plate that includes a protective film matrix having low retardation and can suppress visibility of rainbow mura both in an operating state and in a non-operating state of a liquid crystal display device.

It is another aspect of the present invention to provide a polarizing plate having low reflectivity to improve visibility.

In accordance with one aspect of the present invention, a polarizing plate includes: a polarizing plate and a protective film formed on a light exit surface of the polarizing plate, wherein the protective film includes a first primer layer, a protective film matrix, a second primer layer, and a coating layer sequentially stacked on the polarizing plate, the protective film matrix having an in-plane retardation of 500 nm or less at a wavelength of 550 nm, as represented by the following Equation 2, the protective film satisfying the following Relation 1.

$$(nc+ns)/2-0.025 \le np2 \le (nc+ns)/2+0.025 \qquad \text{<Relation 1>}$$

where nc indicates a refractive index of the coating layer, ns indicates a refractive index of the protective film matrix, and np2 indicates a refractive index of the second primer layer.

$$Re=(nx-ny) \times d \qquad \text{<Equation 2>}$$

where nx and ny are the refractive indices of the protective film matrix in the slow-axis and fast-axis directions thereof at a wavelength of 550 nm, respectively, and d is the thickness of the protective film matrix (unit: nm).

In accordance with another aspect of the present invention, a liquid crystal display device includes a light source, a liquid crystal panel, and a polarizing plate sequentially stacked, wherein the polarizing plate may include the polarizing plate according to the present invention.

The present invention provides a polarizing plate that includes a protective film matrix having low retardation and can suppress visibility of rainbow mura both in an operating state and in a non-operating state of a liquid crystal display device.

The present invention provides a polarizing plate having low reflectivity to improve visibility.

BRIEF DESCRIPTION OF THE DRAWINGS

FIG. 1 is a sectional view of a polarizing plate according to one embodiment of the present invention.

FIG. 2 is a sectional view of a polarizing plate according to another embodiment of the present invention.

FIG. 3 is a sectional view of a polarizing plate according to a further embodiment of the present invention.

DETAILED DESCRIPTION

Hereinafter, embodiments of the present invention will be described in detail with reference to the accompanying drawings such that the present invention can be easily realized by a person having ordinary knowledge in the art. It should be understood that the present invention may be implemented in different ways and is not limited to the following embodiments. In the drawings, portions irrelevant to the description will be omitted for clarity and like components will be denoted by like reference numerals throughout the specification.

As used herein, spatially relative terms such as "upper" and "lower" are defined with reference to the accompanying drawings. Thus, it will be understood that "upper" can be used interchangeably with "lower".

Herein, unless specifically stated otherwise, 'nx', 'ny', and 'nz' mean refractive indices of a protective film matrix at a wavelength of 550 nm in three directions of the protective film matrix (x-axis direction, y-axis direction, and z-axis direction (thickness direction)), respectively. For example, the x-axis direction may be the machine direction (MD) or the fast-axis direction and the y-axis direction may be the transverse direction (TD) or the slow-axis direction.

Herein, the in-plane retardation Re may be represented by Equation 2:

$$Re=(nx-ny) \times d \qquad \text{<Equation 2>}$$

where nx and ny are the refractive indices of a protective film matrix in the slow-axis and fast-axis directions thereof at a wavelength of 550 nm, respectively, and d is the thickness of the protective film matrix (unit: nm).

Herein, the in-plane retardation may mean an absolute value.

Herein, the out-of-plane retardation Rth may be represented by Equation 3:

$$Rth=((nx+ny)/2-nz)\times d \quad \text{<Equation 3>}$$

where nx, ny and nz are the refractive indices of the protective film matrix in the slow-axis, fast-axis, and thickness directions thereof at a wavelength of about 550 nm, respectively, and d is the thickness of the protective film matrix (unit: nm).

Herein, the degree of biaxiality NZ may be represented by Equation 4:

$$NZ=(nx-nz)/(nx-ny) \quad \text{<Equation 4>}$$

where nx, ny and nz are the refractive indices of the protective film matrix in the slow-axis, fast-axis, and thickness directions thereof at a wavelength of about 550 nm, respectively.

Herein, the "refractive index" may be measured at a wavelength of 632 nm using a prism coupler.

Herein, the "light source-side polarizing plate for liquid crystal display devices" means a polarizing plate disposed between a liquid crystal panel and a viewer, that is, at a viewer side of the liquid crystal panel, to transmit light emitted from a backlight unit and having passed through the liquid crystal panel.

Hereinafter, a polarizing plate according to one embodiment of the invention will be described with reference to FIG. 1. FIG. 1 is a sectional view of a polarizing plate according to one embodiment of the present invention.

Referring to FIG. 1, a polarizing plate 100 according to one embodiment may include a polarizer 110, a first protective film 120, and a second protective film 130.

The polarizer 110 may polarize light having passed through the second protective film 130.

The polarizer 110 is composed of a polyvinyl alcohol film and may be manufactured by any method so long as the polarizer is composed of the polyvinyl alcohol film. For example, the polarizer may be manufactured using a modified polyvinyl alcohol film, such as a partially formalized polyvinyl alcohol film, an acetoacetyl group-modified polyvinyl alcohol film, and the like. Specifically, the polarizer may be manufactured by dyeing the polyvinyl alcohol film with iodine or dichroic dyes, followed by stretching the dyed polyvinyl alcohol film in the machine direction (MD). Specifically, the polarizer is manufactured through swelling, dyeing, and stretching the polyvinyl alcohol film. A method for each of these processes is well known to those skilled in the art. The polarizer 110 may have a thickness of 3 µm to 30 µm, specifically 10 µm to 20 µm. Within this range, the polarizer can be used in a polarizing plate.

The first protective film 120 is formed on a light exit surface of the polarizer 110 to transmit light having passed through the polarizer 110.

The first protective film 120 may have a structure wherein a first primer layer 121, a protective film matrix 122, a second primer layer 123, and a coating layer 124 are sequentially stacked on the polarizer 110. The protective film matrix 122 may have an in-plane retardation Re of 500 nm or less at a wavelength of 550 nm and the first protective film 120 may satisfy Relation 1:

$$(nc+ns)/2-0.025 \leq np2 \leq (nc+ns)/2+0.025 \quad \text{<Relation 1>}$$

where nc indicates the refractive index of the coating layer, ns indicates the refractive index of the protective film matrix, and np2 indicates the refractive index of the second primer layer.

The first protective film 120 includes a low retardation protective film matrix, which has an in-plane retardation Re of 500 nm or less at a wavelength of 550 nm, and satisfies Relation 1, thereby suppressing visibility of rainbow mura both in an operating state and in a non-operating state when used as a viewer-side polarizing plate in an optical display device. In the operating state of the optical display device, the first protective film may suppress visibility of rainbow mura due to light (internal light) emitted from a backlight unit of the optical display device, thereby improving visibility and screen quality of the optical display device. In the non-operating state of the optical display device, the first protective film may suppress visibility of rainbow mura generated by the protective film matrix due to natural light (external light), thereby improving black visibility through improvement in external appearance of the optical display device.

Conventionally, the retardation of the first protective film 120 is significantly increased to suppress visibility of rainbow mura due to internal light, or a low refractivity layer is formed on the protective film matrix to suppress visibility of rainbow mura by reducing influence of external light. According to the present invention, the in-plane retardation of the first protective film 120 is reduced to maintain birefringence of the first protective film, and the refractive index of each of the second primer layer and the coating layer sequentially stacked on the first protective film is controlled, thereby suppressing visibility of rainbow mura due to internal light and external light at the same time. It is well known to those skilled in the art that internal light and external light generate rainbow mura through different mechanisms.

The protective film matrix 122 may have in-plane retardation Re of 500 nm or less, preferably 350 nm or less, or 0 nm to 300 nm, at a wavelength of 550 nm. Within this range, the protective film matrix can suppress visibility of rainbow mura due to internal light and external light.

The protective film matrix 122 may have a refractive index (ns) of 1.58 to 1.70, preferably 1.60 to 1.65. Within this range, the protective film matrix 122 can easily satisfy Relation 1.

For the protective film matrix 122, an absolute value (|nx−ny|) of a difference between nx and ny may be 0.01 or less, specifically 0 to 0.008. Within this range, the protective film matrix can further improve viewing angle without generation of rainbow mura.

The protective film matrix 122 may have an out-of-plane retardation Rth of 6,000 nm or more, preferably 6,000 nm to 10,000 nm, at a wavelength of 550 nm. Within this range, the protective film matrix can further suppress visibility of rainbow mura due to internal light. The protective film matrix 122 may have a degree of biaxiality NZ of 10 or more, preferably 12 or more, or 12 to infinity, at a wavelength of 550 nm. Within this range, the protective film matrix can further suppress visibility of rainbow mura due to internal light.

The protective film matrix 122 may be formed of an optically transparent polyester resin. Specifically, the polyester resin may include polyethylene terephthalate, polybutylene terephthalate, polyethylene naphthalate, polybutylene naphthalate, and the like. Preferably, the protective film matrix is a polyethylene terephthalate matrix.

The protective film matrix 122 may have a thickness of 10 µm to 60 µm, preferably 30 µm to 50 µm. Within this range, the protective film matrix can be used in the optical display device and can satisfy the above in-plane retardation.

The protective film matrix 122 may be manufactured by melting and extruding a resin for protective films, followed by biaxially stretching the extruded resin to a preset elongation. For example, the protective film matrix 122 may be manufactured by stretching the resin to 2.5 to 3.5 times an initial length of the film in the MD thereof and to 2.5 to 3.5 times an initial length of the film in the TD thereof after melt extrusion of the resin for protective films. Stretching may be performed by a typical method known to those skilled in the art, such as wet stretching and dry stretching. The above in-plane retardation of the protective film matrix 122 may be obtained by controlling the MD and TD elongations, the stretching temperature, stretching time, and the like.

The first primer layer 121 allows efficient bonding of the protective film matrix 122 to the polarizer 110. The first primer layer 121 has a predetermined thickness to prevent rainbow mura from being visible while improving transmittance of the first protective film. Specifically, the first primer layer 121 may have a thickness of 60 nm to 120 nm, preferably 75 nm to 90 nm. Within this range, the first primer layer allows efficient bonding of the protective film matrix to the polarizing plate and can prevent rainbow mura from being visible while improving transmittance of the first protective film.

When np1 indicates the refractive index of the first primer layer 121, np1, np2, nx, and ny of the protective film satisfy Relation 5 or 6. As a result, the polarizing plate can suppress visibility of rainbow mura both in an operating state and in a non-operating state of the optical display device.

$$np2 \leq np1 \leq ny \leq nx \qquad \text{<Relation 5>}$$

$$np2 \leq np1 \leq nx \leq ny \qquad \text{<Relation 6>}$$

When the refractive index of the first primer layer 121 is indicated by np1, np1−np2 may be 0.1 or less, preferably 0 to 0.1, more preferably 0 to 0.07, 0.03 to 0.07, or 0 to 0.015. Within this range, the first protective film can have improved transmittance.

At least one of the first primer layer 121 and the second primer layer 123 may have a refractive index of greater than 1.5, preferably greater than 1.5 to 1.65 or less. Within this range, the first protective film can suppress visibility of rainbow mura due to external light.

In one embodiment, the first primer layer 121 may have a refractive index (np1) of greater than 1.5, preferably greater than 1.5 to 1.60 or less. Within this range, the first primer layer can improve transmittance of the first protective film.

The first primer layer 121 may be formed of at least one selected from the group consisting of a polyester resin containing a hydrophilic group and a hydrophobic group, a polyvinyl acetate resin, a polyurethane resin, and a combination thereof, without being limited thereto.

The refractive index of the first primer layer 121 within the above range may be achieved by a suitable method through control of the amount or kind of the polyester resin, the polyvinyl acetate resin, or the polyurethane resin.

The second primer layer 123 satisfies Relation 1 to suppress visibility of rainbow mura both in the operating state and in the non-operating state of the optical display device. The second primer layer 123 may promote coupling between the protective film matrix 122 and the coating layer 124 depending upon materials thereof.

In one embodiment, the second primer layer 123 may have a refractive index (np2) of greater than 1.5, preferably greater than 1.5 to 1.60 or less. Within this range, the second primer layer can improve transmittance of the first protective film while suppressing visibility of rainbow mura due to external light.

The second primer layer 123 may have the same thickness as or a different thickness than the first primer layer 121. For example, the second primer layer 123 may have a thickness of 60 nm to 120 nm, preferably 75 nm to 90 nm. Within this range, the second primer layer can prevent rainbow mura from being visible while improving transmittance.

The second primer layer 123 may be formed of the same material as or a different material than the first primer layer 121. For example, the second primer layer 123 may be formed of at least one selected from the group consisting of a polyester resin containing a hydrophilic group and a hydrophobic group, a polyvinyl acetate resin, a polyurethane resin, and a combination thereof, without being limited thereto.

The refractive index of the second primer layer 123 in the above range may be obtained by a suitable method through control of the amount or kind of the polyester resin, the polyvinyl acetate resin, or the polyurethane resin.

The coating layer 124 may be directly formed on the second primer layer 123 to satisfy Relation 1 with the second primer layer and the protective film matrix, thereby suppressing visibility of rainbow mura both in the operating state and in the non-operating state of the optical display device. The coating layer 124 may have a refractive index (nc) of 1.52 to 1.60, preferably 1.53 to 1.58. Within this range, the coating layer can suppress visibility of rainbow mura both in the operating state and in the non-operating state of the optical display device.

The coating layer 124 may have a thickness of 1 μm to 20 μm, preferably 8 μm to 12 μm. Within this thickness range, the coating layer can facilitate thickness reduction of the polarizing plate while improving transmittance thereof.

The coating layer 124 may be formed by coating a composition for the coating layer including at least one of a (meth)acrylic monomer, an oligomer thereof, and a resin thereof; and an initiator on the second primer layer 123, followed by UV curing. The coating layer 124 allows elimination of an adhesive layer and can facilitate formation of the first protective layer satisfying Relation 1. For example, the composition for the coating layer may include a bi- to deca-functional (meth)acrylic monomer and an initiator. Specifically, as a bi- to hexa-functional (meth) acrylic monomer, the composition for the coating layer may include a bifunctional (meth)acrylate, such as 1,4-butanediol di(meth)acrylate, 1,6-hexanediol di(meth)acrylate, neopentyl glycol di(meth)acrylate, polyethylene glycol di(meth) acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth) acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and 9,9-bis[4-(2-bis[4-(2-acryloyloxyethoxy)phenyl]fluorene; a trifunctional acrylate, such as trimethylolpropane tri(meth)acrylate, dipentaerythritol tri(meth)acrylate, propionic acid-modified dipentaerythritol tri(meth)acrylate, pentaerythritol tri(meth) acrylate, propylene oxide-modified trimethylolpropane tri (meth)acrylate, ethylene oxide-modified trimethylolpropane tri(meth)acrylate including ethoxylated (6) trimethylolpropane tri(meth)acrylate, and tris(meth)acryloxyethyl isocyanurate; a tetrafunctional acrylate, such as diglycerin tetra(meth)acrylate and pentaerythritol tetra(meth)acrylate; a pentafunctional acrylate, such as dipentaerythritol penta(meth)acrylate; and a hexafunctional acrylate such as dipentaerythritol hexa(meth)acrylate, and caprolactone-modified dipentaerythritol hexa(meth)acrylate, without being limited thereto. The initiator may include a typical UV initiator well known to those skilled in the art.

The first protective film 120 may have a haze of 1.5% or less, for example, 1.2% or less, or 0.7% or less. Within this range, the first protective film can suppress surface light scattering.

The first protective film 120 may have a transmittance of 94% or more, for example 95% or more. Within this range, the first protective film can improve brightness of the optical display device.

The first protective film 120 may have a thickness of 20 µm to 70 µm, preferably 30 µm to 50 µm. Within this range, the first protective film can be used in the polarizing plate.

The second protective film 130 is formed on a lower surface of the polarizer 110, that is, on a light incidence surface thereof to transmit light received from the liquid crystal panel toward the polarizer 110.

The second protective film 130 may be a film formed of an optically transparent resin. Specifically, the optically transparent resin may include at least one selected from cellulose ester resins including triacetylcellulose and the like, polyester resins including polyethylene terephthalate, polybutylene terephthalate, polyethylene naphthalate, polybutylene naphthalate, and the like, cyclic polyolefin resins including amorphous cyclic olefin polymer (COP), polycarbonate resins, polyether sulfone resins, polysulfone resins, polyamide resins, polyimide resins, non-cyclic polyolefin resins, polyacrylate resins including poly(methyl methacrylate), polyvinyl alcohol resins, polyvinyl chloride resins, and polyvinylidene chloride resins.

The second protective film 130 may have a thickness of greater than 0 µm to 70 µm or less, preferably greater than 0 µm to 60 µm or less. Within this range, the second protective film can be used in the polarizing plate.

The polarizing plate 100 may have a thickness of 25 µm to 500 µm. Within this range, the polarizing plate can be used in a liquid crystal display device. The polarizing plate 100 may have a degree of polarization of 99.99% or more, for example, 99.99% to 99.999%, and a transmittance of 40% or more, for example, 40% to 80% (measured in the visible range, for example, at a wavelength of 550 nm). Within this range, the polarizing plate 100 can prevent deterioration in optical properties when mounted on the liquid crystal display device.

Although not shown in FIG. 1, each of the first protective film 120 and the second protective film 130 may be bonded to the polarizer 110 via a bonding layer for polarizing plates. The bonding layer may include a typical bonding agent, for example, at least one of a water-based bonding agent, a pressure sensitive bonding agent, and a photocurable bonding agent.

In addition, although not shown in FIG. 1, an adhesive layer may be further formed on a lower surface of the second protective film 130 such that the polarizing plate can be used as a viewer-side polarizing plated for the liquid crystal panel via the adhesive layer. The adhesive layer may include a pressure sensitive adhesive, but is not limited thereto.

Next, a polarizing plate according to another embodiment of the invention will be described with reference to FIG. 2. FIG. 2 is a sectional view of a polarizing plate according to another embodiment of the present invention.

Referring to FIG. 2, a polarizing plate 200 according to another embodiment is substantially identical to the polarizing plate 100 according to the above embodiment excluding a first protective film 120A that includes a low refractivity layer 125 further formed on the coating layer 124.

The low refractivity layer 125 is formed on the coating layer 124 and has a lower refractive index than the coating layer 124, thereby reducing the minimum reflectivity of the first protective film 120A. Specifically, the first protective film 120A may have a minimum reflectivity of 0.5% or less, preferably 0 to 0.5%. Within this range, the first protective film has low reflectivity to improve visibility.

A difference in refractive index between the coating layer 124 and the low refractivity layer 125 (refractive index of the coating layer−refractive index of the low refractivity layer) may be 0.2 or more, for example, 0.2 to 0.25. The low refractivity layer 130 may have a refractive index of 1.35 or less, for example, 1.25 to 1.32. Within this range, the low refractivity layer can reduce the minimum reflectivity of the first protective film while improving optical properties thereof.

The low refractivity layer 125 may have a thickness of 50 nm to 300 nm, specifically 80 nm to 200 nm, more specifically 80 nm to 150 nm. Within this range, the low refractivity layer can be used in the polarizing plate.

The low refractivity layer 125 may be formed of a composition for the low refractivity layer, which may include inorganic particles, a fluorine-containing monomer or an oligomer thereof, a fluorine-free monomer or an oligomer thereof, and an initiator. The refractive index of the low refractivity layer 125 may be adjusted by adjusting the amounts of the inorganic particles, the fluorine-containing monomer or oligomer thereof, or the fluorine-free monomer or oligomer thereof.

The inorganic particles have a hollow structure to have a low refractive index, thereby reducing the refractive index of the low refractivity layer. The inorganic particles may have a refractive index of 1.4 or less, for example, 1.3 to about 1.35. The inorganic particles may be hollow silica particles. The inorganic particles may be non-treated hollow particles not subjected to surface treatment or may be subjected to surface treatment with a UV curable functional group. The inorganic particles may have an average particle diameter D50 of 30 nm to 150 nm, for example, 50 nm to 100 nm, which may be the same as or different from the thickness thereof. Within this range, the inorganic particles may be contained in the low refractivity layer and can improve optical properties, such as haze and transmittance.

The fluorine-containing monomer or the oligomer thereof reduces the refractive index of the low refractivity layer together with the inorganic particles and forms a matrix of the low refractivity layer together with the fluorine-free monomer or oligomer thereof. The fluorine-containing monomer may include a fluorine-containing (meth)acrylate compound. The fluorine-containing monomer may include a typical compound well-known to those skilled in the art.

The fluorine-free monomer or the oligomer thereof forms the matrix of the low refractivity layer and may include a UV curable compound. The fluorine-free monomer or the oligomer thereof may be a bi- or higher functional (meth)acrylate compound, for example, a bi- to deca-functional (meth)acrylate compound. Specifically, the fluorine-free monomer may include a polyfunctional (meth)acrylate, such as an ester of a polyhydric alcohol and (meth)acrylic acid, as described above.

The additive may include a typical UV initiator well-known to those skilled in the art.

The composition for the low refractivity layer may include 20 wt % to 70 wt % of the inorganic particles, 10 wt % to 50 wt % of the fluorine-containing monomer or the oligomer thereof, 5 wt % to 25 wt % of the fluorine-free monomer or the oligomer thereof, and 1 wt % to 5 wt % of the initiator in terms of solid content. Within this range, the composition for the low refractivity layer can secure a pencil hardness of 2H or higher while providing an anti-fingerprint effect. Preferably, the composition for the low refractivity layer includes 40 wt % to 55 wt % of the inorganic particles, 30 wt % to 50 wt % of the fluorine-containing monomer or the oligomer thereof, 5 wt % to 15 wt % of the fluorine-free monomer or the oligomer thereof, and 1 wt % to 4 wt % of the initiator, in terms of solid content.

The composition for the low refractivity layer may further include a typical additive well known to those skilled in the art. For example, the composition for the low refractivity layer composition may further include at least one of a defoamer, an antioxidant, a UV absorbent, a photostabilizer, a leveling agent, a fluorine-containing additive, and a silicon-based additive, without being limited thereto. The additives may be present in an amount of 1 wt % to 10 wt % in the composition for the low refractivity layer in terms of solid content.

The composition for the low refractivity layer may further include a solvent to further improve coatability thereof. The solvent may include at least one of methylethylketone, methylisobutylketone, and ethylene glycol dimethyl ether.

Next, a polarizing plate according to a further embodiment of the invention will be described with reference to FIG. 3. FIG. 3 is a sectional view of a polarizing plate according to a further embodiment of the present invention.

Referring to FIG. 3, a polarizing plate 300 according to a further embodiment is substantially identical to the polarizing plate 100 according to the above embodiment excluding a first protective film 120B that includes a high refractivity layer 126 and a low refractivity layer 125 sequentially formed on the coating layer 124.

The low refractivity layer 125 is the same as the low refractivity layer described above.

The high refractivity layer 126 is formed on the coating layer 124 and has a higher refractive index than the coating layer 124. The high refractivity layer 126 has a higher refractive index than the low refractivity layer 125. Accordingly, the high refractivity layer 126 can further reduce the minimum reflectivity of the first protective film 120B. Specifically, the first protective film 120B has a minimum reflectivity of 0.5% or less, preferably 0 to 0.5%, 0 to 0.2%, or 0 to 0.15%. Within this range, the first protective film has low reflectivity to improve visibility.

The high refractivity layer 126 may be formed of a composition for the high refractivity layer, which includes at least one of a high refractivity resin and inorganic particles having a high refractive index; a UV curable compound; and an initiator, to reduce the minimum reflectivity of the first protective film while improving hardness thereof and preventing antistatic effects.

The high refractivity resin may include at least one of fluorene, biphenyl, bisphenol, thiophenyl, thiobenzyl, phenyl sulfide, and thionaphthalene-based resins.

The inorganic particles having a high refractive index can impart a function of increasing refractivity of the high refractivity layer and a function of improving hardness of the coating layer. The inorganic particles may be non-treated inorganic particles not subjected to surface treatment or may be surface-treated inorganic particles (for example, surface treatment with a (meth)acrylate group) to improve compatibility with other components in the composition and to further improve hardness of the high refractivity layer. The inorganic particles may include zirconia, titania, silica, and the like. Preferably, the inorganic particles are zirconia particles. The zirconia particles can secure good dispersion with the high refractivity resin and the UV curable compound to reduce haze of the high refractivity resin, thereby improving transmittance of the first protective film.

The UV curable compound has a lower refractive index than the high refractivity resin and may have a UV curable group, for example, a (meth)acrylate group or an epoxy group. The UV curable compound may include a bi- or higher functional (meth)acrylate monomer, for example, a bi- to hexafunctional (meth)acrylate monomer, an oligomer thereof, and a resin thereof.

The initiator may include at least one of typical photo-radical initiators and photo-cationic initiators known to those skilled in the art.

The composition for the high refractivity layer may include 10 wt % to 20 wt % of the high refractivity resin, 10 wt % to 20 wt % of the UV curable compound, 2 wt % to 5 wt % of the initiator, and 30 wt % to 70 wt % of the inorganic particles. With this content, the composition for the high refractivity layer can increase the refractive index of the high refractivity layer to reduce the minimum reflectivity and haze of the first protective film.

The composition for the high refractivity layer may further include a typical additive well known to those skilled in the art. For example, the composition for the high refractivity layer composition may further include at least one of an antistatic agent, a defoamer, an antioxidant, a UV absorbent, a photostabilizer, and a leveling agent, without being limited thereto. The antistatic agent serves to reduce surface resistance of the low refractivity layer and may include a typical antistatic agent well known to those skilled in the art. For example, the antistatic agent may contain quaternary ammonium cations and anions. Examples of the anions may include a halogen ion, $HSO^{4-}$, $SO_4^{2-}$, $NO^{3-}$, $PO_4^{3-}$, and the like. The additive may be present in an amount of 5 wt % to 20 wt % in the composition for the high refractivity layer in terms of solid content.

The composition for the high refractivity layer may further include a solvent to further improve coatability thereof. The solvent may include at least one of propylene glycol monomethyl ether and methylethylketone.

A liquid crystal display device according to the present invention may include a liquid crystal display device including the polarizing plate according to the embodiments of the invention. The liquid crystal display device may include: a liquid crystal panel; a first polarizing plate formed on an upper surface (viewer-side) of the liquid crystal panel; a backlight unit disposed below a lower surface (light source-side) of the liquid crystal panel; and a second polarizing formed on the lower surface of the liquid crystal panel to be disposed between the liquid crystal panel and the backlight unit, wherein the first polarizing plate may include the polarizing plate according to the embodiments of the invention.

The liquid crystal panel includes a liquid crystal panel including a liquid crystal cell layer encapsulated between a first substrate and a second substrate. In one embodiment, the first substrate may be a color filter (CF) substrate (upper substrate) and the second substrate may be a thin film transistor (TFT) substrate (lower substrate). The first substrate and the second substrate may be the same or different and may be a glass substrate or a plastic substrate. The plastic substrate may be formed of a plastic material applicable to a flexible display, such as polyethylene terephthalate (PET), polycarbonate (PC), polyimide (PI), polyethylene naphthalate (PEN), polyether sulfone (PES), polyarylate (PAR), and cycloolefin copolymer (COC), without being limited thereto. The liquid crystal cell layer may include liquid crystals driven in a vertical alignment (VA) mode, an in-place switching (IPS) mode, a fringe field switching (FFS) mode, or a twisted nematic (TN) mode.

The second polarizing plate may include a typical polarizing plate.

The backlight unit is typically used in a liquid crystal display device and may include a light source, a light guide plate, a reflection plate, a diffusion plate, and the like.

Next, the present invention will be described in more detail with reference to some examples. However, it should be noted that these examples are provided for illustration only and are not to be construed in any way as limiting the present invention.

Example 1

A polarizer was prepared by stretching a polyvinyl alcohol film (VF-PS6000, Kuraray Co., Ltd., thickness: 60 μm) to 3 times an initial length thereof at 60° C., dyeing the stretched film with iodine, and stretching the dyed film to 2.5 times the length of the stretched film in a boric acid solution at 40° C.

A film prepared through melt extrusion of a polyethylene terephthalate (PET) resin was stretched to 2.5 times an initial length thereof in the MD while mechanically moving the film on rolls in the MD, followed by stretching the film to 2.5 times an initial length thereof in the TD, thereby preparing a polyethylene terephthalate film. The polyethylene terephthalate film had a thickness of 45 μm, Re of 500 nm according to Equation 2, Rth of 9,600 nm according to Equation 3, and NZ of 20 according to Equation 4 at a wavelength of 550 nm. The prepared polyethylene terephthalate film was used as a matrix of a first protective film. Re, NZ, and Rth were measured using a retardation meter (Axoscan, AxoMetric Inc.) at a wavelength of 550 nm.

A first primer layer and a second primer layer each having a refractive index and a thickness as listed in Table 1 were formed on both surfaces of the prepared polyethylene terephthalate film.

A coating layer having a refractive index as listed in Table 1 was formed on the second primer layer by depositing a composition comprising 95 parts by weight of dipentaerythritol hexaacrylate as a UV curable resin and 5 parts by weight of an initiator (Igacure-184, BASF) thereon, followed by UV curing, thereby preparing a first protective film.

A polarizing plate was prepared by bonding the first protective film to one surface of the prepared polarizer via a bonding agent for polarizing plates coated thereon and bonding a triacetylcellulose film (zero TAC thickness: 40 μm), as a second protective film, to the other surface of the polarizer via a bonding agent for polarizing plates. The first protective film has a structure wherein a first primer layer, a protective film matrix, a second primer layer, and a coating layer are sequentially stacked on the polarizing plate in the stated order.

Example 2

A polarizing plate was prepared in the same manner as in Example 1 except that the MD elongation, TD elongation and retardation of the polyethylene terephthalate film were changed as listed in Table 1.

Example 3

A polarizing plate was prepared in the same manner as in Example 1 except that the refractive index of the second primer layer was changed as listed in Table 1.

Example 4

A polarizing plate was prepared in the same manner as in Example 1 except that the thickness of each of the first primer layer and the second primer layer was changed as listed in Table 1.

Example 5

2.75 g of dipentaerythritol hexaacrylate as a fluorine-free monomer was completely dissolved in 61.3 g of a hollow silica-containing sol (THRULYA 5320, JGC Catalyst & Chemicals Ltd.) to prepare a mixture. 5.17 g of a fluorine-containing monomer (AR-110, Daikin Co., Ltd.) was added to the mixture and stirred for 5 minutes. Then, 0.75 g of an initiator (Irgacure 184, BASF) was added to the mixture and completely dissolved therein. 197 g of methylethylketone (Samchun Chemical Co., Ltd.) was added to the mixture and stirred for 30 minutes, thereby preparing a composition for low refractivity layers.

A first primer layer and a second primer layer were formed to thicknesses as listed in Table 1 on both surfaces of the polyethylene terephthalate film in the same manner as in Example 1, respectively.

A coating layer having a refractive index as listed in Table 1 was formed on the second primer layer by depositing a composition comprising 95 parts by weight of dipentaerythritol hexaacrylate as a UV curable resin and 5 parts by weight of an initiator (Igacure-184, BASF) thereon, followed by UV curing, thereby preparing a first protective film.

A polarizing plate was prepared in the same manner as in Example 1 except that a low refractivity layer having a refractive index of 1.31 was formed on the coating layer by coating the prepared composition for the low refractivity layer on one surface of the coating layer.

Examples 6 and 7

A polarizing plate was prepared in the same manner as in Example 5 except that the refractive index of the low refractivity layer was changed as listed in Table 1 by changing the content of hollow silica.

Example 8

A composition for a high refractivity layer was prepared by mixing dipentaerythritol hexaacrylate, high refractivity particles (zirconia, $ZrO_2$, Ranco Co., Ltd.) and an initiator (Irgacure-184, BASF).

A composition for a low refractivity layer was prepared in the same manner as in Example 5.

A first primer layer and a second primer layer each having a refractive index and a thickness as listed in Table 1 were formed on both surfaces of the prepared polyethylene terephthalate film 1 in the same manner as in Example 1, respectively.

A coating layer having a refractive index as listed in Table 1 was formed on the second primer layer by depositing a composition comprising 95 parts by weight of dipentaerythritol hexaacrylate as a UV curable resin and 5 parts by weight of an initiator (Igacure-184, BASF) thereon, followed by UV curing.

A polarizing plate was prepared in the same manner as in Example 1 except that a high refractivity layer having a refractive index of 1.65 and a low refractivity layer having a refractive index of 1.31 were sequentially formed on the coating layer by coating the composition for the high refractivity layer and the composition for the low refractivity layer on one surface of the coating layer, followed by curing.

Comparative Examples 1 and 2

A polarizing plate was prepared in the same manner as in Example 1 except that the retardation of the polyethylene terephthalate film was changed by changing the MD and TD elongations of the polyethylene terephthalate resin.

Comparative Examples 3 and 4

A polarizing plate was prepared in the same manner as in Example 1 except that the refractive index of the second primer layer was changed as listed in Table 1.

TABLE 2

|  | Rainbow mura | | First protective film | |
|---|---|---|---|---|
|  | Operating state | Non-operating state | Haze (%) | Reflectivity (%) |
| Example 1 | Low level | Low level | 0.7 | 5.1 |
| Example 2 | Very low level | Low level | 0.7 | 5.1 |
| Example 3 | Low level | Low level | 0.7 | 5.1 |
| Example 4 | Low level | Very low level | 0.7 | 4.9 |
| Example 5 | Low level | Low level | 1.2 | 0.49 |
| Example 6 | Low level | Low level | 1.2 | 0.45 |
| Example 7 | Low level | Low level | 1.15 | 0.34 |
| Example 8 | Low level | Low level | 0.49 | 0.15 |
| Comparative Example 1 | High level | Low level | 0.7 | 5.1 |
| Comparative Example 2 | High level | Low level | 0.7 | 5.1 |
| Comparative Example 3 | Low level | High level | 0.7 | 5.3 |
| Comparative Example 4 | Low level | High level | 0.7 | 5.3 |

As shown in Table 2, the polarizing plates according to the present invention include a protective film matrix having

TABLE 1

|  | Protective film matrix | | First primer layer | | Second primer layer | | Coating layer | Low refractivity layer | High refractivity layer |
|---|---|---|---|---|---|---|---|---|---|
|  | Refractive Index | Re (nm) | Refractive Index | Thickness (nm) | Refractive Index | Thickness (nm) | Refractive Index | Refractive Index | Refractive Index |
| E1 | 1.60 | 500 | 1.565 | 75 | 1.565 | 75 | 1.53 | — | — |
| E2 | 1.60 | 300 | 1.565 | 75 | 1.565 | 75 | 1.53 | — | — |
| E3 | 1.60 | 500 | 1.565 | 75 | 1.565 | 75 | 1.53 | — | — |
| E4 | 1.60 | 500 | 1.565 | 90 | 1.55 | 90 | 1.53 | — | — |
| E5 | 1.60 | 500 | 1.565 | 75 | 1.565 | 75 | 1.53 | 1.31 | — |
| E6 | 1.60 | 500 | 1.565 | 75 | 1.565 | 75 | 1.53 | 1.30 | — |
| E7 | 1.60 | 500 | 1.565 | 75 | 1.565 | 75 | 1.53 | 1.29 | — |
| E8 | 1.60 | 500 | 1.565 | 75 | 1.565 | 75 | 1.53 | 1.31 | 1.65 |
| CE1 | 1.60 | 2000 | 1.565 | 75 | 1.565 | 75 | 1.53 | — | — |
| CE2 | 1.60 | 4000 | 1.565 | 75 | 1.565 | 75 | 1.53 | — | — |
| CE3 | 1.60 | 500 | 1.565 | 75 | 1.60 | 75 | 1.53 | — | — |
| CE4 | 1.60 | 500 | 1.565 | 75 | 1.53 | 75 | 1.53 | — | — |

The first protective films and the polarizing plates prepared in Examples and Comparative Examples were evaluated as to the following properties and results are shown in Table 2.

(1) Rainbow mura: Rainbow mura was observed on a specimen combined with a black acryl plate of Nitto resin (CL-885) with the naked eye under a three-wavelength lamp. For evaluation of rainbow mura, the three-wavelength lamp was turned on or off. Visibility of rainbow mura was rated as a very low level, a low level, a middle level, and a high level. The very low level indicates that rainbow mura was not observed and the high level indicates that rainbow mura was observed.

(2) Haze of first protective film: Haze of the first protective film was measured using an NDH-2000 (Nippon Denshoku), with the low reflectivity coating layer placed at an opposite side to a light source.

(3) Reflectivity of first protective film: Reflectivity of the first protective film was measured on a specimen combined with a black acryl plate of Nitto resin (CL-885) using a UV-Vis spectrometer (PerkinElmer, Lamda 1050).

low retardation and can suppress visibility of rainbow mura both in an operating state and in a non-operating state of an optical display device. In particular, the polarizing plates of Examples 5 to 8 had low reflectivity to secure good visibility.

On the contrary, the polarizing plates of Comparative Examples 1 to 4 not within the scope of the present invention failed to suppress visibility of rainbow mura in the operating state or the non-operating state of the optical display device.

It should be understood that various modifications, changes, alterations, and equivalent embodiments can be made by those skilled in the art without departing from the spirit and scope of the present invention.

The invention claimed is:

1. A viewer-side polarizing plate for liquid crystal display devices, comprising: a polarizer; and a first protective film formed on a light exit surface of the polarizer,
wherein the first protective film comprises a first primer layer, a protective film matrix, a second primer layer, and a coating layer sequentially stacked on the polarizer,
the first protective film satisfying Relation 1:

$$(nc+ns)/2-0.025 \leq np2 \leq (nc+ns)/2+0.025,$$ <Relation 1> where nc indicates a refractive index of the coating layer, ns indicates a refractive index of the protective film matrix, and np2 indicates a refractive index of the second primer layer, the protective film matrix having an in-plane retardation of 500 nm or less at a wavelength of 550 nm, as represented by Equation 2:

$$Re=(nx-ny)\times d, \qquad \text{<Equation 2>}$$

where nx and ny are refractive indices of the protective film matrix in the slow-axis and fast-axis directions thereof at a wavelength of 550 nm, respectively, and d is a thickness of the protective film matrix (unit: nm), and wherein, when np1 indicates a refractive index of the first primer layer, np1, np2, nx, and ny of the first protective film satisfy Relation 5 or 6:

$$np2 \leq np1 \leq ny \leq nx; \qquad \text{<Relation 5>}$$

$$np2 \leq np1 \leq nx \leq ny. \qquad \text{<Relation 6>}$$

2. The viewer-side polarizing plate for liquid crystal display devices according to claim 1, wherein the protective film matrix is a polyester film matrix.

3. The viewer-side polarizing plate for liquid crystal display devices according to claim 2, wherein the polyester comprises at least one of polyethylene terephthalate, polybutylene terephthalate, polyethylene naphthalate, and polybutylene naphthalate.

4. The viewer-side polarizing plate for liquid crystal display devices according to claim 1, wherein at least one of the first primer layer and the second primer layer has a refractive index of greater than 1.5.

5. The viewer-side polarizing plate for liquid crystal display devices according to claim 1, wherein each of the first primer layer and the second primer layer has a refractive index of greater than 1.5.

6. The viewer-side polarizing plate for liquid crystal display devices according to claim 1, wherein each of the first primer layer and the second primer layer has a thickness of 60 nm to 120 nm.

7. The viewer-side polarizing plate for liquid crystal display devices according to claim 1, wherein the first protective film has a haze of 1.5% or less.

8. The viewer-side polarizing plate for liquid crystal display devices according to claim 7, wherein the haze of the first protective film is 1.2% or less.

9. The viewer-side polarizing plate for liquid crystal display devices according to claim 7, wherein the haze of the first protective film is 0.7% or less.

10. The viewer-side polarizing plate for liquid crystal display devices according to claim 1, wherein the refractive index of the coating layer is 1.52 to 1.60.

11. The viewer-side polarizing plate for liquid crystal display devices according to claim 1, wherein the coating layer has a thickness of 1 μm to 20 μm.

12. The viewer-side polarizing plate for liquid crystal display devices according to claim 1, further comprising: a second protective film formed on a light incidence surface of the polarizer.

13. A liquid crystal display device comprising a liquid crystal panel and a polarizing plate disposed at a viewer side of the liquid crystal panel, wherein the polarizing plate comprises the viewer-side polarizing plate for liquid crystal display devices according to claim 1.

14. A viewer-side polarizing plate for liquid crystal display devices, comprising: a polarizer; and a first protective film formed on a light exit surface of the polarizer, wherein the first protective film comprises a first primer layer, a protective film matrix, a second primer layer, and a coating layer sequentially stacked on the polarizer, the first protective film satisfying Relation 1:

$$(nc+ns)/2-0.025 \leq np2 \leq (nc+ns)/2+0.025, \qquad \text{<Relation 1>}$$

where nc indicates a refractive index of the coating layer, ns indicates a refractive index of the protective film matrix, and np2 indicates a refractive index of the second primer layer, the protective film matrix having an in-plane retardation of 500 nm or less at a wavelength of 550 nm, as represented by Equation 2:

$$Re=(nx-ny)\times d, \qquad \text{<Equation 2>}$$

where nx and ny are refractive indices of the protective film matrix in the slow-axis and fast-axis directions thereof at a wavelength of 550 nm, respectively, and d is a thickness of the protective film matrix (unit: nm), and wherein the first protective film further comprises: a low refractivity layer formed on an upper surface of the coating layer and having a lower refractive index than the coating layer.

15. The viewer-side polarizing plate for liquid crystal display devices according to claim 14, wherein the first protective film has a minimum reflectivity of 0.5% or less.

16. A viewer-side polarizing plate for liquid crystal display devices, comprising: a polarizer; and a first protective film formed on a light exit surface of the polarizer, wherein the first protective film comprises a first primer layer, a protective film matrix, a second primer layer, and a coating layer sequentially stacked on the polarizer, the first protective film satisfying Relation 1:

$$(nc+ns)/2-0.025 \leq np2 \leq (nc+ns)/2+0.025, \qquad \text{<Relation 1>}$$

where nc indicates a refractive index of the coating layer, ns indicates a refractive index of the protective film matrix, and np2 indicates a refractive index of the second primer layer, the protective film matrix having an in-plane retardation of 500 nm or less at a wavelength of 550 nm, as represented by Equation 2:

$$Re=(nx-ny)\times d, \qquad \text{<Equation 2>}$$

where nx and ny are refractive indices of the protective film matrix in the slow-axis and fast-axis directions thereof at a wavelength of 550 nm, respectively, and d is a thickness of the protective film matrix (unit: nm), and wherein the first protective film further comprises: a high refractivity layer and a low refractivity layer sequentially formed on an upper surface of the coating layer, the low refractivity layer having a lower refractive index than the high refractivity layer.

17. The viewer-side polarizing plate for liquid crystal display devices according to claim 16, wherein the first protective film has a minimum reflectivity of 0.5% or less.

* * * * *